(Model.)

E. D. WESTON.
FLUE SCRAPER.

No. 361,736. Patented Apr. 26, 1887.

Witnesses
Josie S. Latimer
R. T. Campbell

Inventor
Edward D. Weston
By his Attorney
Frank Sheehy.

N. PETERS, Photo-Lithographer, Washington, D. C.

UNITED STATES PATENT OFFICE.

EDWARD D. WESTON, OF JACKSON, MICHIGAN, ASSIGNOR OF ONE-HALF TO PETER T. McKINNEY, OF SAME PLACE.

FLUE-SCRAPER.

SPECIFICATION forming part of Letters Patent No. 361,736, dated April 26, 1887.

Application filed February 26, 1886. Serial No. 193,323. (Model.)

*To all whom it may concern:*

Be it known that I, EDWARD D. WESTON, a citizen of the United States, residing at Jackson, in the county of Jackson and State of Michigan, have invented certain new and useful Improvements in Flue-Scrapers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
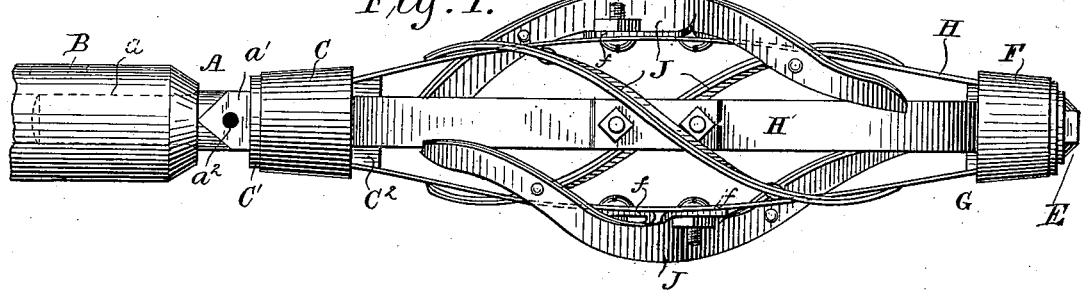
Figure 2:
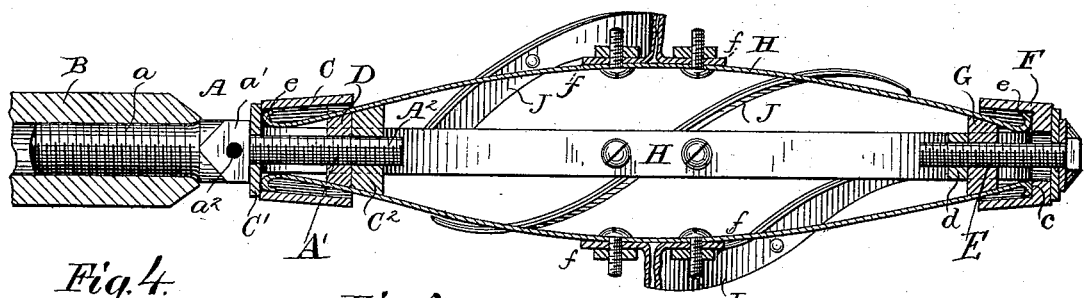
Figure 4:
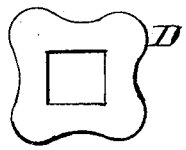
Figure 5:
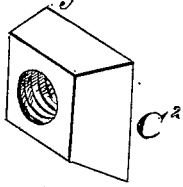
Figure 3:
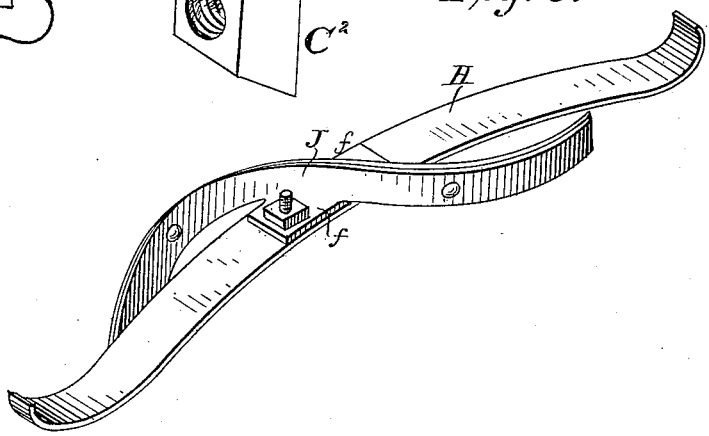

Figure 1 is an elevation of one side of my improved flue or chimney scraper. Fig. 2 is a diametrical section through the scraper. Fig. 3 is a perspective view of one of the spring-bows and scraping-ribs. Fig. 4 is a face view of the spider D. Fig. 5 is a perspective view of the beveled nut $C^2$.

This invention relates to devices which are designed for scraping soot, &c., from flues or chimneys; and it consists in certain novel devices adapted for the accomplishment of the object in view, which will be fully understood from the following description, when taken in connection with the annexed drawings, and particularly pointed out in the claim.

A designates a screw-threaded shank or stock, consisting of the enlarged threaded portion $a$, adapted to enter a socket in a handle, B, which latter may be composed of more than one jointed section. At the terminus of the threaded portion $a$ is a shoulder, $a'$, and, if desired, holes $a^2$, to receive a wrench-rod for tightly securing the several parts hereinafter described together, may be employed. A' designates a screw-threaded stem projecting axially from the portion $a$.

C designates a tapered thimble or socket; C', a washer between the thimble and the shoulder $a'$, and $C^2$ a rectangular beveled nut, which latter forms an intermediate bearing for elliptic springs, hereinafter explained. Between the said nut and thimble, and on the small projecting screw-stem A', I apply a spider, D, which is not screw-threaded, and which is designed to serve as a guide and holder for the inner ends of the elliptic springs, above referred to. At the outer ends of the said springs I employ a combined locking device and tie for the springs, which is constructed as follows:

E designates a flat-head screw, adapted to be turned (for convenience) by a wrench. On this screw is applied a conical thimble, F, also one or more washers between its outer end and the head of the screw, and internally the thimble F is provided with an annular shoulder, $c$. I also apply on the threaded portion of the stem of screw E a beveled spreader, G, and a common square or set nut, $d$. The part G not only serves as a spreader and a binder for the aforesaid elliptic springs, but it also serves, in connection with the thimble F and other devices described and shown, to firmly grip the elliptic springs at the outer end of the scraper. The small nut $d$ serves in this combination with or without a washer as a jam-nut. I will now explain the scraping devices.

H designates an elliptic spring, the terminal ends of which may be curved outward, as indicated at $e$ $e$, for the purpose of holding longitudinally the parts above described together, and also to afford a purchase by means of which the springs in question can be bellied or expanded and contracted at will to adapt the device to different gages or diameters of flues or chimneys. It is obvious that the curves $e$ $e$ on the ends of the springs H may be omitted without departing from the spirit of my invention. To these leaf elliptic springs, at or near the middle of their length, I attach my improved serpentine scraping-blades J by means of flanges and bolt and screw fastenings, as shown in the annexed drawings.

Fig. 3 shows a compound serpentine or segment of a helical blade made of two plates of steel or other suitable metal, each plate having a flange, $f$, and both plates riveted together.

It is obvious that a single plate or scraper may be used, or that several plates may be combined to form a scraper. I may employ clips or other suitable fastenings for the serpentine scraping-plates. Therefore I do not confine myself to the bolt and nut fastenings which I show.

It will be observed from the foregoing description that I have a flue-scraper provided with serpentine scraping-blades, which scraper can be expanded or contracted in diameter and readily adjusted to flues of different diameters, which blades are accommodated by the elasticity of their springs to the inequalities of the surfaces of the flues. It will also be observed that the combined springs and blades are readily removable from the instrument, and that the serpentine blades can be readily removed from the springs.

Having described my invention, I claim—

The combination of the shank A, having screw-threaded portions, as described, the tapered thimble C, the washer C', the nut C², the spider D, semi-elliptic springs provided with scrapers, the headed screw E, the shouldered conical thimble F, the spreader G, and a set-nut, all constructed and adapted to operate substantially in the manner and for the purposes described.

In testimony whereof I affix my signature in presence of two witnesses.

EDWARD D. WESTON.

Witnesses:
W. F. JOHNSON,
ENOCH BANCKER.